United States Patent
Åberg et al.

(10) Patent No.: US 10,521,267 B2
(45) Date of Patent: Dec. 31, 2019

(54) PRIORITY TRAINER FOR MANY CORE PROCESSING SYSTEM

(71) Applicant: Telefonaktiebolaget LM Ericsson (publ), Stockholm (SE)

(72) Inventors: Patrik Åberg, Södra Sandby (SE); Magnus Templing, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 617 days.

(21) Appl. No.: 14/916,591

(22) PCT Filed: Dec. 21, 2015

(86) PCT No.: PCT/EP2015/080832
§ 371 (c)(1),
(2) Date: Mar. 4, 2016

(87) PCT Pub. No.: WO2017/108079
PCT Pub. Date: Jun. 29, 2017

(65) Prior Publication Data
US 2017/0300357 A1 Oct. 19, 2017

(51) Int. Cl.
*G06F 9/48* (2006.01)
(52) U.S. Cl.
CPC .................. *G06F 9/4881* (2013.01)
(58) Field of Classification Search
CPC ............... G06F 9/4883; G06F 9/4887
See application file for complete search history.

(56) References Cited

U.S. PATENT DOCUMENTS 8,887,120 B1* 11/2014 Verma ................. G06F 17/5031
326/101
10,157,081 B2 12/2018 Aberg et al.
(Continued)

FOREIGN PATENT DOCUMENTS

EP 1061443 A2 12/2000
EP 2192492 A1 11/2010
(Continued)

OTHER PUBLICATIONS

Geiger et al., "Rapid Modeling and Discovery of Priority Dispatching Rules: an Autonomous Learning Approach", Journal of Scheduling 9: 7-34, 2006 (Year: 2006).*
(Continued)

*Primary Examiner* — Francisco J Aponte
*Assistant Examiner* — Kevin X Lu
(74) *Attorney, Agent, or Firm* — Coats & Bennett, PLLC

(57) ABSTRACT

A method of a priority trainer of a many core processing system comprising a plurality of cores is disclosed. The many core processing system is configured to execute one or more computer jobs, and wherein the priority trainer comprises a controller, the method comprising:

receiving (201), from a slack meter, a set of probes comprising a worst case probe, wherein each of the probes indicates a respective system slack of the many core processing system, wherein the worst case probe indicates a least system slack among the set of probes, and wherein the system slack is indicative of available system idle time;

adding (202) a synthetic variable load to the beginning of each of the one or more computer jobs to be executed by the many core processing system, wherein the synthetic variable load indicates a time delay of the execution of the one or more computer jobs;

(Continued)

placing (203) the worst case probe in at least one location within each of the one or more computer jobs for measuring a real time slack of the one or more computer jobs during a current measurement cycle;

determining (205) a priority for each of the one or more computer jobs based on the measured real time slack and the least system slack; and ranking (206) the one or more computer jobs in a priority list based on the determined priorities.

19 Claims, 3 Drawing Sheets

(56) References Cited

U.S. PATENT DOCUMENTS

| | | | |
|---|---|---|---|
| 2002/0120661 | A1 | 8/2002 | Binns et al. |
| 2005/0240923 | A1 | 10/2005 | Duke |
| 2006/0107264 | A1 | 5/2006 | Schmidt et al. |
| 2006/0288346 | A1* | 12/2006 | Santos ............... G06F 9/4887 718/102 |
| 2007/0234014 | A1 | 10/2007 | Kobayashi et al. |
| 2007/0247469 | A1* | 10/2007 | Aberg ................. G06F 12/023 345/543 |
| 2010/0088706 | A1 | 4/2010 | Dong et al. |
| 2010/0131958 | A1* | 5/2010 | Cazorla Almeida ...... G06F 9/52 718/104 |
| 2012/0204184 | A1* | 8/2012 | Terashima ............ G06F 9/4881 718/103 |
| 2012/0291048 | A1* | 11/2012 | Bharadwaj .......... G06F 11/3414 719/318 |
| 2013/0139170 | A1* | 5/2013 | Prabhakar ............. G06F 9/4893 718/104 |
| 2013/0249917 | A1* | 9/2013 | Fanning ................ G06T 11/206 345/440 |
| 2014/0010539 | A1* | 1/2014 | Varanese ............... H04J 3/1694 398/66 |
| 2014/0129811 | A1 | 5/2014 | Yamauchi et al. |
| 2015/0186241 | A1 | 7/2015 | Funk et al. |
| 2016/0330746 | A1* | 11/2016 | Mehrabanzad ....... H04W 76/10 |

FOREIGN PATENT DOCUMENTS

| | | |
|---|---|---|
| EP | 2362297 B1 | 5/2014 |
| FR | 2997774 A1 | 5/2014 |
| WO | 2007077516 A1 | 7/2007 |
| WO | 2013158968 A1 | 10/2013 |
| WO | 2014104912 A1 | 7/2014 |
| WO | 2015050594 A1 | 4/2015 |
| WO | 2017080613 A1 | 5/2017 |
| WO | 2017108079 A1 | 6/2017 |

OTHER PUBLICATIONS

Shin et al; "Intra-Task Voltage Scheduling on DVS-Enabled Hard Real-Time Systems"; IEEE Transaction on Computer Aided Design of Intergrated Circuits and Systems; Oct. 1, 2005; pp. 1530-1549; vol. 24, No. 10; XP011139827; IEEE Service Center; Piscataway, NJ.

Zhan et al; "Optimizing the NoC Slack Through Voltage and Frequency Scaling in Hard Real-Time Embedded Systems"; IEEE Transactions on Computer-Aided Design of Integrated Circuits and System; Nov. 1, 2014; pp. 1632-1643; vol. 33, No. 11; XP011561790; IEEE Service Center; Piscataway, NJ.

Rountree et al; "Bounding Energy Consumption in Large-Scale MPI Programs"; Proceedings of the 2007 ACM/IEEE Conference on Supercomputing; Nov. 10-16, 2007; Reno, NV; pp. 1-9; XP031577181; IEEE; Piscataway, NJ.

Baskaran et al; "Dynamic Scheduling of Skippable Periodic Tasks with Energy Efficiency in Weakly Hard Real-Time System"; International Journal of Computer Science & Information Technology (IJCSIT); Dec. 2010; pp. 100-111; vol. 2, No. 6.

* cited by examiner

PRIORITY TRAINER FOR MANY CORE PROCESSING SYSTEM

TECHNICAL FIELD

The present invention relates generally to the field of embedded systems. More particularly, it relates to priority scheduling of one or more computer jobs to be executed by a many core processing system in order to enhance system performance.

BACKGROUND

Processors known as multi core processors comprise a plurality of processing units commonly referred to as cores. The plurality of cores typically enables parallel and/or simultaneous execution of computer tasks/jobs/threads/processes etc. New powerful systems are however developed where the amount of cores reaches hundreds or even thousands. These systems are known as many core systems, many core processing systems or many core processors, which terms may be used interchangeably in this disclosure.

In computer systems there may exist a wish to investigate system utilization in the cores. Reasons for this may e.g. be resource pool control in a cloud or to facilitate power saving in embedded systems. The resource pool may e.g. comprise system memory, system cores and/and or system cache.

In the first case, knowledge may be gained regarding when it would be necessary or beneficial to increase the system resource pool and in the latter when it would be necessary or beneficial to go into a mode of execution characterized by lower performance and/or lower power consumption.

The increasing amount of cores typically makes it difficult to accurately determine available system resources and to accurately determine how to best distribute the available system resources.

For example, in order to save power and/or increase performance of the many core system, it may be desirable to be able to utilize the available system resources to their full extent. Numerous scheduling algorithms exist today that try to maximize system performance by grouping computer related jobs with dependencies or by having priority schemes or the like.

However, these solutions typically do not provide a very accurate measurement on available resources and how to best distribute them.

Thus, there exists a need for methods and devices for a many core processing system which enable enhanced, optimized or alternative utilization of system resources.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some of the embodiments to solve or mitigate at least some of the problems described above or other problems by providing methods of a priority trainer of a many core processing system, a priority trainer of a many core processing system and a computer program product in order to enable enhanced or at least an alternative way of prioritizing computer jobs in order to efficiently utilize available resources.

According to a first aspect, this is achieved by a method of a priority trainer of a many core processing system comprising a plurality of cores. The many core processing system is configured to execute one or more computer jobs, and the priority trainer comprises a controller. The method comprises:
  receiving, from a slack meter, a set of probes comprising a worst case probe, wherein the probes indicates a respective system slack of the many core processing system. The worst case probe indicates the least system slack among the set of probes, and the system slack is indicative of available system idle time;
  adding a synthetic variable load to the beginning of each of the one or more computer jobs to be executed by the many core processing system, wherein the synthetic variable load determines a time delay of the execution of the one or more computer jobs;
  placing the worst case probe by at least one location within each of the one or more computer jobs for measuring a real time slack of the one or more computer jobs during a current measurement cycle;
  determining a priority for each of the one or more computer jobs based on the measured real time slack; and
  ranking (106) the one or more computer jobs in a priority list based on the determined priorities.

In some embodiments, the many core processing system may e.g. be a many core processor. In some embodiments, the many core processing system may be comprised in an embedded system e.g. a system on a chip. In some embodiments, the many core processing system may be comprised in a computer, e.g. a personal computer, laptop, mobile phone or the like.

In some embodiments, the plurality of cores represents a plurality of processors for carrying out computer related jobs simultaneously and/or in parallel.

In some embodiments, the computer jobs may e.g. be one or more of a computer process, a task thread, a task, an internal system task, an external user induced assignment or the like.

In some embodiments, the slack meter may be a part of the priority trainer and connected to the controller.

In some embodiments, the slack meter may be operatively connected to the priority trainer. The term operatively should be interpreted as that the slack meter may be removably connected to the priority trainer, i.e. the slack meter may be removed and added and does not necessarily have to constitute a part of the priority trainer.

In some embodiments, slack time may refer to system idle time. I.e. the slack time is a measurement of how much time the many core processing system spends without performing any operation.

In some embodiments, a probe may measure an execution time of each of the one or more jobs in order to determine how much slack time the many core processing system has left when the one or more jobs has been executed, thus determine how execution of the one or more jobs will affect the many core processing system.

In some embodiments, a probe may be deployed in the computer code which executes the one or more computer jobs on the many core processing system. The probe may e.g. be a software function which measures execution time in real time and compares it to allowable execution time in real time.

For example, in some embodiments, the computer code may start a timer when the program code execution of the one or more computer jobs starts. The software function (i.e.

the probe) is placed at one or more measuring points within the computer code and measures how long it took the program code execution to arrive at the one or more measuring points from the start of the execution. The measured time may then be compared to an allowed execution time, where the difference between the measured time and the allowed execution time denotes the real time slack.

In some embodiments, the synthetic variable load may be determined according to $SL*(t1-t0)$, wherein SL is a scale factor, t0 equals a start of an execution time for each the one or more computer jobs, and t1 equals an end of the execution time for each of the one or more computer jobs.

In some embodiments, the synthetic variable load may indicate a time delay during which the system waits before staring execution of the computer task.

Since the synthetic variable load indicates a time delay for executing the one or more computer jobs, the synthetic variable load does not itself demand any system resources to execute. Thus it only represents how an increase or decrease in available system recourses may affect the performance of the many core processing system and the execution of the one or more computer jobs.

Thus, the synthetic variable load may simulate how a potential change of frequency may affect execution of the one or more jobs and which of the one or more jobs that will be most affected.

In some embodiments, the one or more computer jobs may be executed reoccuringly on the many core processing system. The synthetic variable load may be added to each of the one or more computer jobs and the worst case probe may be placed for measuring the real time slack in each of the one or more jobs during a current measurement cycle for each reoccurring execution.

In some embodiments, the scale factor SL may be determined based on measured real time slack for a previous measurement cycle.

Thus, the previous measurement cycles will determine the synthetic variable load for the current measurement cycle for each of the one or more computer jobs.

Thus, by means of the synthetic variable load and the worst case probe the priority trainer may in some embodiments determine which computer job out of the one or more jobs will demand the longest execution time, and based on this schedule that job to be executed first.

In some embodiments, the synthetic variable load is added to each of the one or more computer jobs one at the time in order to determine the priority of that particular computer job.

In some embodiments, the real time slack may be expressed in terms of one or more of radio network time, network time protocol—NTP—and/or Greenwich Mean Time—GMT—wherein the priority may be ranked in the priority list such that a measured first real time slack being larger than a measured second real time slack results in a corresponding first priority ranking being higher than a corresponding second priority ranking in the priority list.

In some embodiments, adding the synthetic variable load and placing the worse case probe may be carried out for each of the one or more computer jobs according to a round robin algorithm.

In some embodiments, all of the method steps may be carried out according to a round robin algorithm for each of the one or more computer jobs.

In some embodiments, scheduling the one or more computer jobs for execution according to the priority list may be such that a computer job having the highest priority ranking among the priorities in the priority list is scheduled to be executed first.

In some embodiments, the method may comprise that the one ore more jobs are only scheduled to be executed according to priority if there is no available core out of the plurality of cores for executing the one or more jobs. In such case it may be of importance that the computer jobs which demands most resources are executed first so that remaining idle time on the core may be utilized more efficiently thus increasing the overall system performance.

In some embodiments, the priority list may be utilized for scheduling the one or more computer jobs to be executed on a preferred core.

In some embodiments, the method may further comprise forming a priority template comprising the synthetic variable load and the priority list and associating the priority template to the set of probes comprising the worst case probe.

In some embodiments, the method further comprises storing the priority template associated with the set of probes comprising the worst case probe in a data base for future use.

In some embodiments, the priority trainer may train the many core processing system to recognize a set of probes comprising a worst case probe and apply a suitable priority template in order to determine a priority for execution of the one or more computer jobs.

In some embodiments a suitable priority template may e.g. be a priority template which is stored in the memory and associated with the recognized set of probes.

In some embodiments, a suitable priority template may e.g. be a priority template which is stored in memory and associated to a set of probes being similar to the recognized set of probes.

In order to recognize a received set of probes, the trainer may e.g. check its database if the set of probes are already stored along with an associated priority template. In some embodiments, the received set of probes does not have to equal a stored set of probes. It may e.g. be sufficient if the received set of probes is similar to a stored set of probes, e.g. by being within a variance of a stored set of probes.

A similar set of probes may e.g. indicate system slacks being within a variance of the system slacks of the recognized probes. E.g., if the system slacks vary less than 10%, 15%, or 20% from the recognized slacks they may be deemed to be within the variance. Other percentages or values are of course possible and may be determined based on the type of the computer jobs or the purpose of the priority ranking or on other system parameters such as system resources, multitude of system cores, amount of computer jobs etc.

Thus, whenever the trainer receives a set of probes which it recognizes, it may retrieve a priority template which is associated to the set of probes, and apply the priority according to the retrieved priority template to the one or more computer jobs.

A second aspect is a computer program product comprising a computer readable medium having thereon computer program instructions. The computer program product is loadable into a data-processing unit comprising a processor and a memory and is adapted to cause the data-processing unit to execute at least the steps of the method according to the first aspect when the computer program is run by the data processing unit.

A third aspect is a priority trainer of a many core processing system comprising a plurality of cores. The many core processing system is configured to execute one or more computer jobs, and the priority trainer comprises a controller. The controller is configured to:

receive, from a slack meter, a set of probes comprising a worst case probe, wherein the probes indicates a respective system slack of the many core processing system, wherein the worst case probe indicates the least system slack among the set of probes, and wherein the system slack is indicative of available system idle time;

add a synthetic variable load to the beginning of each of the one or more computer jobs to be executed by the many core processing system, wherein the synthetic variable load determines a time delay of the execution of the one or more computer jobs;

place the worst case probe to measure by at least one location within each of the one or more computer jobs a real time slack of the one or more computer jobs during a current measurement cycle;

determine a priority for each of the one or more computer jobs based on the measured real time slack and the least system slack; and rank the one or more computer jobs in a priority list based on the determined priorities.

In some embodiments, the controller may further be configured to determine the synthetic variable load according to $SL*(t1-t0)$, wherein SL is a scale factor, t0 equals a start of an execution time for each the one or more computer jobs, and t1 equals an end of the execution time for each of the one or more computer jobs.

In some embodiments, the controller may be further configured to determine SL based on measured real time slack for a previous measurement cycle.

For example, if the measured real time slack is too short, then SL for a subsequent measurement cycle may be reduced. A too short slack may e.g. be that it does not cross a minimum slack threshold, leading to that the system performance is no longer acceptable. A short real time slack indicates that the many core processing system is low on idle time, which indicates that there may soon be a lack of system resources for executing more computer jobs.

The slack threshold may be dynamically set by the priority trainer based on the types of computer jobs to be executed and/or the amount of computer jobs to be executed. Other system parameters may be utilized in order to set the slack threshold, such as available resources, amount of cores, system frequency etc.

In some embodiments, the controller may further be configured to express the real time slack in terms of one or more of a radio network time, network time protocol—NTT—and/or Greenwich Mean Time—GMT—wherein the priority is ranked in the priority list such that a measured first real time slack being larger than a measured second real time slack results in a corresponding first priority ranking being higher than a corresponding second priority ranking in the priority list.

In some embodiments, the controller may be configured to add the synthetic variable load and place the worse case probe for each of the one or more computer jobs according to a round robin algorithm.

In some embodiments, the priority trainer may further comprise a job scheduler, wherein the controller is further configured to cause the job scheduler to schedule the one or more computer jobs for execution according to the priority list such that a computer job having the highest priority ranking among the priorities in the priority list is scheduled to be executed first.

In some embodiments, the controller may further be configured to form a priority template comprising the synthetic variable load and the priority list and associating the priority template to the set of probes comprising the worst case probe.

In some embodiments, the controller may further be configured to store the priority template associated to the set of probes comprising the worst case probe in a data base for future use.

In some embodiments, the priority trainer may be configured to train the many core processing system to recognize a set of probes comprising a worst case probe and to apply a suitable priority template in order to determine a priority for execution of the one or more computer jobs.

In some embodiments, the second aspects may additionally have features identical with or corresponding to any of the various features as explained above for the first aspect.

An advantage of some embodiments is that computer jobs may be scheduled such that efficient utilization of system resources is enabled, preferably as efficient as possible.

Another advantage of some embodiments is the many core processing system may predict how the execution of the computer tasks will affect system resources.

Another advantage of some of the embodiments is that the scheduling may result that unutilized system slack resulting from the effective priority scheduling may be traded in for power and/or performance, enhancing the overall system performance.

Another advantage of some of the embodiments is that computer jobs may be scheduled to be carried out on a preferred core.

BRIEF DESCRIPTION OF THE DRAWINGS

Further objects, features and advantages will appear from the following detailed description of embodiments, with reference being made to the accompanying drawings, in which.

DETAILED DESCRIPTION

Figure 1:
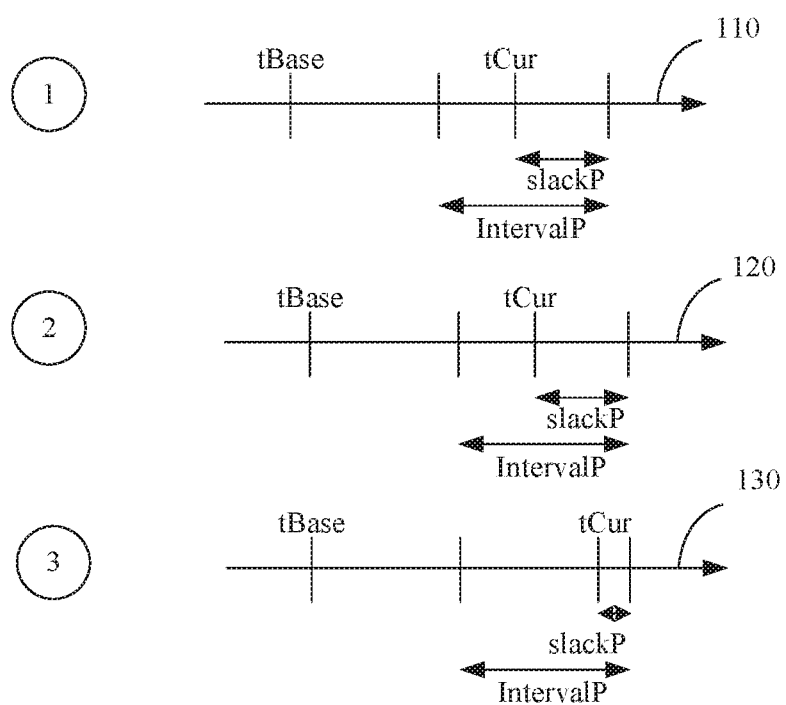
FIG. 1 is a schematic drawing of time interval.

In the following, embodiments will be described where enhanced resource utilization is enabled in a many core processing system by means of an efficient priority trainer.

A problem with conventional solutions is that they are rule/algorithm based and does not take into consideration the running system as such. Even more important, they typically focus on computer system and system tasks (also referred to as jobs or computer jobs in this disclosure) rather than actual outside world tasks that e.g. may be initiated by a user, or on real time context which the computer system may be designed for. Because of this, prioritized jobs typically are just computer system jobs and not real time computer jobs (all though it is possible that these two types coincide).

This may result in problems since a job which demands a lot of resources from the system in order to be executed may be executed after all of the computer system jobs. This in turn may lead to that there may not be sufficient resources left to execute it, or that resources are distributed in a non-efficient manner.

It is to be noted that in this disclosure the term "job" or "computer job" may refer interchangeably to terms such as (computer) threads, task threads, processes and/or tasks or the like.

The inventors have realized after insightful reasoning that by prioritizing jobs according to their resource need, i.e. by measuring how much slack the system has left after performing the job, and executing jobs according to that priority, system resources can be utilized more efficiently. However, there has not previously existed a was to accurately measure system slack.

In order to accurately measure overall system slack, a trainer (also referred to in this disclosure as slack meter) as disclosed in patent application PCT/EP EP2015/0765357 may be utilized.

The slack meter may be implemented by means of

1. A synthetic variable load, which acts as a time delay for a task thread and does therefore not consume energy (controlled sleep i.e. the thread is set to sleep in order to delay the execution), the synthetic variable load is incorporated in a thread scheduler for a many core system or a cloud and is applied in the beginning of all threads scheduled for execution during a first execution cycle by the many core system. The variable load can be calculated as SL*(t1–t0) where t0 equals thread start execution and t1 thread end execution times and where SL is a system load constant value.

2. A generic probe mechanism incorporated into those places in the execution of the task thread where a certain real-time requirement exists. The real-time requirement may e.g. be expressed in radio network time. The probes may be continuously ranked in a list based on worst-case real-time behavior when executed. This data is then being used by a training mechanism (see bullet 3 and 4).

3. A training element that iterates through the probes and calculates a real time slack measurement constant—RS— value based on the worst-case real-time behavior of the probes. The worst case RS value of the probes is then used in order to calculate the SL value (see bullet 1) for the next measurement period and a new synthetic variable load may be determined based on RS and SL.

4. A system performance/resource manager that adjusts at least one of a system frequency, a resource pool and underlying parameters e.g. voltage with the aim to keep the real time slack constant RS to a minimum, thus utilizing the system in the most enemy efficient way. The resource manager may receive information from the training mechanism (bullet 3) pertaining to the effect of a possible frequency change on the many core system since the training mechanism controls the synthetic variable load (bullet 1). Since the synthetic variable load (which does not consume energy) is proportional to the individual tasks being performed by the many core system itself, the effect of changing frequency is also proportional to the synthetic load and can thus be calculated. In this way, the training element and the resource manager constitutes a training mechanism. The training mechanism can thus train the many core system to recognize a certain use-case and associate an optimal frequency or other system parameter with that certain use-case. Thus, whenever that certain use case occurs, e.g. whenever a user uses a certain app or function, the system will automatically know which parameters should be set in order to utilize resources in the most efficient manner.

RS may for example be calculated by means of an interval being defined by the many core system which indicates how long a task may take is utilized.

In FIG. 1 this is illustrated by intervalP on intervals 110, 120 and 130.

Intervals 110, 120 and 130 each represents intervals where probes 1, 2 and 3 respectively have been set to measure a real time requirement during execution of a task thread.

tCur illustrates where one or more probes have measured a real time requirement, and the interval slackP illustrates how much idle time the system has after executing the scheduled task thread. The real time slack measurement constant value, RS, may be calculated by dividing slackP with intervalP, in this way a percentage is obtained.

If tCur moves towards either of the edges of the intervalP, then that is an indication that the system frequency needs to be adjusted. However, tCur may also indicate if a change of frequency is possible. E.g. if tCur is positioned in the vicinity of the middle of intervalP that is an indication that decrease in frequency is possible, and the system parameters may be adjusted accordingly.

In some embodiments, tCur may indicate the worst case tuning on which the RS value may be based.

The RS value may be calculated for each of the probes 1, 2 and 3 and their respective intervals.

E.g. the probes 1, 2 and 3 all measure real time requirement within execution of a task thread during intervals 110, 120 and 130 respectively. As mentioned above, intervalP defines an interval within which tCur should preferably be inside.

Probes 1 and 2 indicate that there is room for frequency adjustment, i.e. calculation of RS will yield a high percentage, whereas probe 3 indicates that the execution time is near the interval edge on the right, i.e. the execution time is nearing a maximum allowable time and RS for probe 3 will yield a low percentage (since the slackP will be small compared to intervalP).

In some embodiments the worst case RS-value may be calculated as a normalized vector according to the following formula $$\frac{\left| t_p - \frac{t_1 + t_0}{2} \right|}{t_1 - t_0} * 2$$

wherein t0 equals a start of a thread execution and t1 equals an end of the thread execution and tp is the probe activation time.

SL may be determined based on RS. For example, if RS is determined to be above the time threshold, then SL is increased, resulting in that a larger variable load is added to the task thread, thus simulating a decrease in system frequency.

If RS is determined to be beneath the time threshold, then SL is decreased, resulting in that a smaller variable load is added to the task thread, thus simulating an increase in system frequency.

SL may thus be determined by trial based on how RS changes.

Thus a history of varying RS, SL and associated system parameters may be build up for various tasks. The many core system may utilize this history in order to learn how to set RS, SL and optimal system parameters for future tasks in order to utilize its resources as energy efficient as possible.

The set of probes comprising the probe having measured the worst case real time (also referred to as the worst case probe in this disclosure) is then provided to a priority trainer of a many core processing system according to some embodiments.

Figure 2:
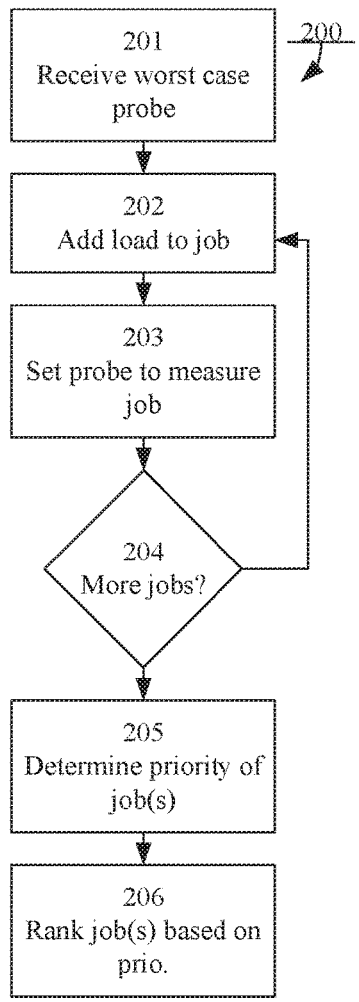
FIG. 2 is a flowchart illustrating example method steps according to some embodiments.

FIG. 2 illustrates an example method 200 of a priority trainer according to some embodiments for determining priority of one or more computer jobs to be executed by a many core processing system.

The method starts in 201 where the priority trainer receives from a slack meter, a set of probes comprising a worst case probe. The probes indicates a respective system slack of the many core processing system, wherein the worst case probe indicates the least system slack among the set of probes, and wherein the system slack is indicative of available system idle time. The slack meter may e.g. be the trainer of a many core processing system as described above.

The probes comprised in the set of probes may each indicate a system real time slack, i.e. how much idle time the system presides over after having executed a plurality of computer threads comprising computer tasks, where each thread has been equipped with a time delay in order to simulate a possible change of frequency of the many core processing system, and how this affects execution.

In some embodiments, a probe may be deployed in the computer code which executes the one or more computer jobs on the many core processing system. The probe may e.g. be a software flag which measures execution time in real time and compares it to allowable execution time in real time.

For example, in some embodiments, the computer code may start a timer when the program code execution of the one or more computer jobs starts. The software flag (i.e. the probe) is placed at one or more measuring points within the computer code and measures how long it took the program code execution to arrive at the one or more measuring points from the start of the execution. The measured time may then be compared to an allowed execution time, where the difference between the measured time and the allowed execution time denotes the real time slack.

The worst case probe may indicate how much delay that may be added at most to a thread in order for the many core processing system to still be able to execute the tasks of the thread satisfactionally, i.e. within a preferred time span.

The worst case probe is then utilized in the method 200 in order to determine a priority of the one or more computer jobs.

In 202 of the example method 200, a synthetic variable load is added to the beginning of each of the one or more computer jobs to be executed by the many core processing system, wherein the synthetic variable load determines a time delay of the execution of the one or more computer jobs.

The synthetic variable load may in some embodiments be determined according to SL*(t1−t0), wherein SL is a scale factor, t0 equals a start of an execution time for each the one or more computer jobs, and t1 equals an end of the execution time for each of the one or more computer jobs.

The scale factor SL may be based on previous measurements received from previous measurement cycles possibly in combination with the least system slack indicated by the worst case probe.

In some embodiments, the scale factor SL may be determined as described above for the slack meter.

The synthetic variable load is a time delay that is proportional to the system frequency. I.e. a larger synthetic variable load corresponds to a lower system frequency.

In order to receive measurements, the method continues in 203 wherein the worst case probe is placed by at least one location within each of the one or more computer jobs in order to measure a real time slack of the one or more computer jobs during a current measurement cycle. Since each of the one or more jobs are provided with the synthetic variable load a delay is introduced which simulates how much the computer job will affect the system in terms of execution time if the system frequency is altered. The synthetic variable load indicates a time delay for executing the one or more computer jobs, the synthetic variable load does not itself demand any system resources to execute. Thus it only represents how an increase or decrease in available system recourses may affect the performance of the many core processing system and the execution of the one or more computer jobs.

By utilizing the worst case probe in order to measure the real time slack a total worst case scenario can be found, i.e. which of the one ore more computer jobs will demand most resources to be executed or will affect performance of the many core processing system the most.

For example, if the measured real time slack is too long, then SL for a subsequent measurement cycle may be reduced. A too long slack may e.g. be that it has crossed a slack threshold, and the system performance is no longer acceptable. The slack threshold may be dynamically set by the priority trainer based on the types of computer jobs to be executed and/or the amount of computer jobs to be executed. Other system parameters may be utilized in order to set the slack threshold, such as available resources, amount of cores, system frequency etc.

The real time slack may in some embodiments be expressed in terms of one or more of a radio network time, network time protocol—NTP—and/or Greenwich Mean Time—GMT.

The method may in some embodiments continue to 204 wherein it is determined if there are more computer jobs to be executed. If it is determined that there are more computer jobs to be executed, the method continues to step 202 where the synthetic variable load is added to the subsequent job. Thus, adding 202 the synthetic variable load and placing 203 the worse case probe is carried 204 out for each of the one or more computer jobs according to a round robin algorithm.

In some embodiments, step 204 may be left out of the method (as indicated by the dashed box), in such case the steps of the method are performed according to a round robin fashion for each of the one or more computer jobs.

The method continues in 205 where a priority is determined for each of the one or more computer jobs based on the measured real time slack. For example, the computer job which is measured to have the smallest real time slack, i.e. having the least system idle time which is left after executing the job, in comparison to the rest of the computer jobs, will be determined to have the highest priority.

In 106 of the method 200, the one or more computer jobs are ranked in a priority list based on the determined priorities. E.g. in some embodiments, the priority is ranked in the priority list such that a measured first real time slack being larger than a measured second real time slack results in a corresponding first priority ranking being higher than a corresponding second priority ranking in the priority list The list is preferably ranked in a descending manner, i.e. highest priority first, but could also be ranked in other ways depending on intended use of the results. In some embodiments, it may be desirable to run the most demanding computer jobs after running the non demanding computer jobs.

In some embodiments, the method 200 may further comprise scheduling the one or more computer jobs for execution according to the priority list such that a computer job having the highest priority ranking among the priorities in the priority list is scheduled to be executed first.

In some embodiments, the method 200 may comprise that the one ore more jobs are only scheduled to be executed according to priority if there is no available core, out of the plurality of cores, to execute the one or more jobs on. In such case it may be of greater importance that the computer jobs which demands most resources are executed first so that remaining idle time on the core may be utilized more efficiently thus increasing the overall system performance.

In some embodiments, priority list may be utilized in order to schedule the computer jobs to be executed on a preferred core. E.g. certain computer jobs may be more suited to be run on a particular core than others.

In order for the priority trainer to actually train the many core processing system, previous measurements and priority lists may be stored in a database for use in future measurement cycles.

The one or more computer jobs may be executed by the many core processing system in a cyclic manner, i.e. a computer job may be executed several times subsequently. During each execution cycle a measurement cycle is performed wherein the synthetic variable load is added to the computer job, and the worst case probe is placed for measuring the real time slack in the computer job.

The priority of the computer job is determined based on how the variable load affected the computer during the execution cycle, however, the determined priority will not be utilized until the following execution cycle. During the following execution cycle (and measurement cycle), the priority which was determined based on the previous measurement cycle will be evaluated, and in turn help determine the priority for the coming execution cycle.

Figure 3:
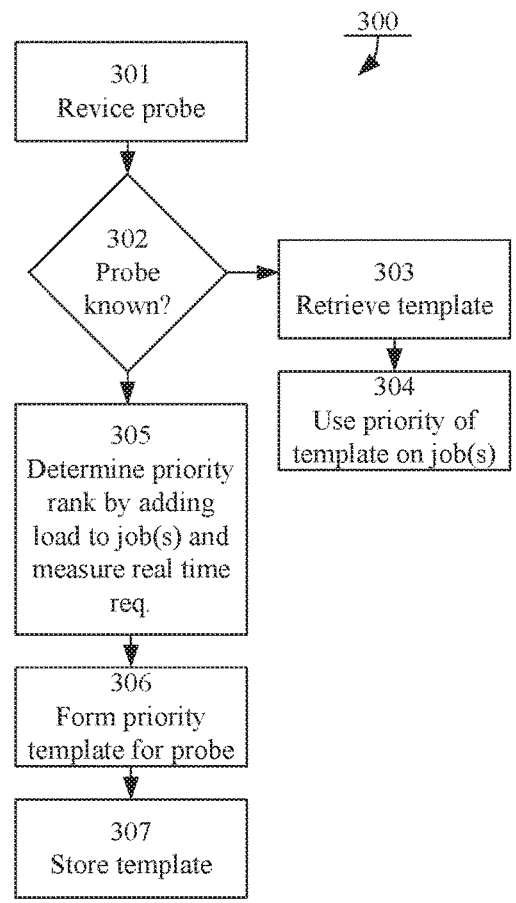
FIG. 3 is a flowchart illustrating example method steps according to some embodiments.

FIG. 3 illustrates an example method 300 according to some embodiments. In some embodiments, the method 300 may be combined with the example method 200 described in conjunction with FIG. 2.

The method 300 starts in 301 where the priority trainer receives from a slack meter, a set of probes comprising a worst case probe. The probes indicates a respective system slack of the many core processing system, wherein the worst case probe indicates the least system slack among the set of probes, and wherein the system slack is indicative of available system idle time. The slack meter may e.g. be the trainer of a many core processing system as described above.

The probes comprised in the set of probes may each indicate a system real time slack, i.e. how much idle time the system presides over after having executed a plurality of computer threads comprising computer tasks, where each thread has been equipped with a time delay in order to simulate a possible change of frequency of the many core processing system, and how this affect execution.

The worst case probe may indicate how much delay that may be added at the most to a thread in order for the many core processing system to still be able to execute the tasks of the thread satisfactionally, i.e. within a preferred time span.

The worst case probe is then utilized in the method 300 in order to determine a priority of the one or more computer jobs.

In 302 of the method 300, it is determined if the priority trainer recognizes the set of probes comprising the worst case probe. The trainer may e.g. check its database in if the set of probes are already stored along with an associated priority template. In some embodiments, the received set of probes does not have to equal a stored set of probes. It may e.g. be sufficient if the received set of probes is within a variance of a stored set of probes.

For example, if the system slack pertaining to each of the received set of probes are 4, 3, 6, 2 and 5 ms, then a stored set of probes may be deemed as equal or similar if the system slack pertaining to each probe are within +/−1 ms of the system slacks of the received set of probes. Other variances are of course possible and the above example should be seen as explanatory and not limiting to the invention.

If in 302 it is determined that the received set of probes are known, the method continues in 303 where the priority template which is associated with the recognized set of probes is retrieved. The priority template comprises the synthetic variable load and the priority list which was used for the computer jobs measured by the recognized set of probes.

In 304 the synthetic variable load and the priority list of the stored priority template is utilized for prioritizing the computer jobs.

If in 302, it is determined that the set of probes are not recognized, i.e. there is no stored corresponding set of probes, then the method continues in 306 where a synthetic variable load is added to each of the one or more computer jobs, and the worst case probe of the set of probes is placed to measure real time slack of the one or more computer jobs (e.g. as described in steps 201 and 202 of method 200 in FIG. 1).

The measured real time slack is then used for determining a priority of the one or more computer jobs and ranking the priories pertaining to each of the one or more computer jobs in a priority list (e.g. as described in steps 204, 205 and 206 of method 200 in FIG. 2).

The method 300 continues in 306 where a priority template is formed comprising the synthetic variable load and the priority list and wherein the priority template is associated to the received set of probes comprising the worst case probe.

In 307 of the method 300 the priority template associated with the set of probes comprising the worst case probe is stored in the data base for future use.

Storing the priority template and their associated set of probes makes it possible for the priority trainer to train the many core processing system to recognize 302 a received set of probes comprising a worst case probe and apply 304 a suitable priority template in order to determine a priority for execution of the one or more computer jobs.

In some embodiments, a suitable priority template may e.g. be priority template which is stored in memory and associated to a set of probes being similar to the recognized set of probes.

A similar set of probes may e.g. indicate system slacks being within a variance of the system slacks of the recognized probes. E.g., if the system slacks varies less than 10%, 15%, or 20% from the recognized slacks they may be deemed to be within the variance. Other percentages or values are of course possible and may be determined based on types of computer jobs or purpose of the priority ranking.

Figure 4:
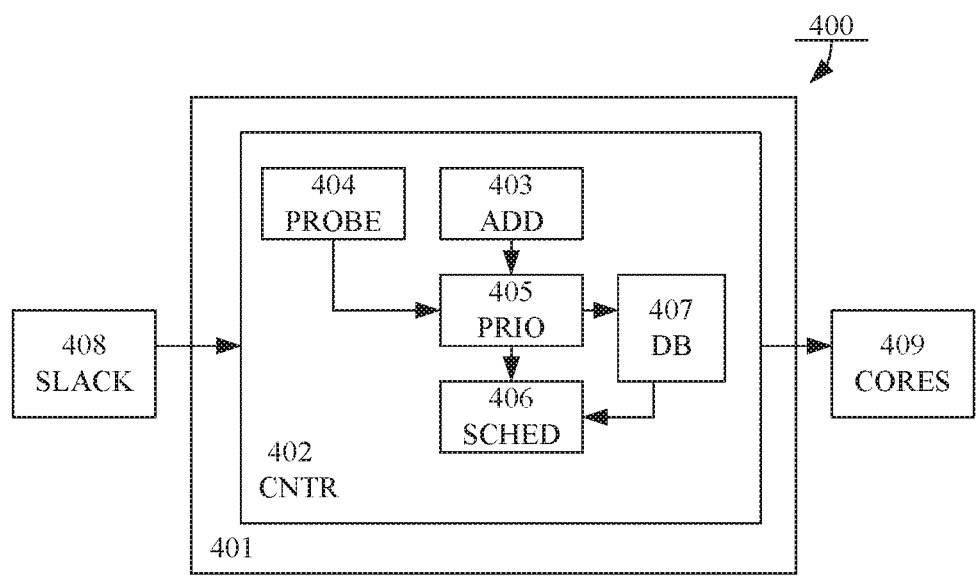
FIG. 4 is a block diagram illustrating an example arrangement according to some embodiments.

FIG. 4 illustrates an example arrangement 400 of a priority trainer 401 of a many core processing system comprising a plurality of cores (CORES) 409, wherein the many core processing system is configured to execute one or more computer jobs. The priority trainer 401 comprises a controller (CNTR) 402. The controller 402 comprises a load adder (ADD) 403, a probe placer (PROBE) 404, a priority mechanism (PRIG) 405, a priority scheduler (SCHED) 406 and a database (DB) 407.

A slack meter (SLACK) 408 may be operatively connected to the priority trainer 401. In some embodiments, the slack meter 408 may be comprised within the priority trainer 401.

The arrangement 400 may in some embodiments be configured to carry out any of the methods 200 and/or 300 as described in conjunction with FIGS. 2 and 3.

The controller 302 is configured to receive, from the slack meter 408, a set of probes comprising a worst case probe, wherein the probes indicates a respective system slack of the many core processing system, wherein the worst case probe indicates the least system slack among the set of probes, and wherein the system slack is indicative of available system idle time.

The probes comprised in the set of probes may each indicate a system real time slack, i.e. how much idle time the system presides over after having executed a plurality of computer threads comprising computer tasks, where each thread has been equipped with a time delay in order to simulate a possible change of frequency of the many core processing system, and how this affect execution.

The worst case probe may indicate how much delay that may be added at the most to a thread in order for the many core processing system to still be able to execute the tasks of the thread satisfactionally, i.e. within a preferred time span.

The controller is further configured to cause the load adder to calculate a synthetic variable load according to $SL*(t1-t0)$, wherein SL is a scale factor, t0 equals a start of an execution time for each the one or more computer jobs, and t1 equals an end of the execution time for each of the one or more computer jobs.

The controller 402 then causes load adder 403 to add the synthetic variable load to the beginning of each of the one or more computer jobs to be executed by the many core processing system, wherein the synthetic variable load determines a time delay of the execution of the one or more computer jobs.

The controller 402 is further configured to cause the probe placer 404 to place the worst case probe by at least one location within each of the one or more computer jobs for measuring a real time slack of the one or more computer jobs during a current measurement cycle.

The worst case probe measures how much slack time (also referred to as idle time) that is left for each of the one or more executed computer jobs. Since each of the one or more computer jobs are provided with the synthetic variable load a delay is introduced which simulates how much the computer job will affect the system in terms of execution time if the system frequency is altered. By utilizing the worst case probe in order to measure the real time slack a total worst case scenario can be found, i.e. which of the one or more computer jobs will take most resources to execute or will affect performance of the system the most.

The real time slack may in some embodiments be expressed in terms of one or more of a radio network time, network time protocol—NTP—and/or Greenwich Mean Time—GMT.

The measured real time slack is then used in order to determine a priority for the one or more computer jobs (compare with steps 205 and 305 of the methods 200 and 300 described in FIGS. 2-3).

Furthermore, as the measured real time slack is dependant on the added synthetic variable load, the controller may in some embodiments be further configured to determine SL based on measured real time slack for a previous measurement cycle.

For example, if the measured real time slack is too long, then SL for a subsequent measurement cycle may be reduced. A too long slack may e.g. be that it has crossed a slack threshold, and the system performance is no longer acceptable. The slack threshold may be dynamically set by the priority trainer based on the types of computer jobs to be executed and/or the amount of computer jobs to be executed. Other system parameters may be utilized in order to set the slack threshold, such as available resources, amount of cores, system frequency etc.

In some embodiments, the controller 402 may be configured to add the synthetic variable load and place the worse case probe for each of the one or more computer jobs according to a round robin algorithm. In some embodiments, the controller may cause the load adder 403, the probe placer 404, and the priority mechanism 405 to carry out their tasks as described above for each of the one or more computer jobs continuously according to a round robin algorithm.

The controller 402 may be further configured to cause the priority mechanism to determine a priority for each of the one or more computer jobs based on the measured real time slack and possibly the least system slack and rank the one or more computer jobs in a priority list based on the determined priorities (compare with steps 206 and 305 of the method 200 and 300 of FIGS. 2-3). The priority mechanism may e.g. rank the priorities in the priority list such that a measured first real time slack which is larger than a measured second real time slack results in a corresponding first priority ranking being higher than a corresponding second priority ranking in the priority list. E.g. if the worst case probe measures the real time slack of a first computer job to be 2 ms and the real time slack of a second computer job to be 1 ms, then the second computer job will receive priority 1 and be ranked higher than the second computer job which will receive priority 2.

In some embodiments, the controller 402 is further configured to cause the job scheduler 406 to schedule the one or more computer jobs for execution according to the priority list such that a computer job having the highest priority ranking among the priorities in the priority list is scheduled to be executed first.

In some embodiments, the controller 402 is configured to cause the scheduler to only schedule the one ore more jobs to be executed according to priority if there is no available core to execute the one or more jobs out of the plurality of cores 409.

In such case it may be of greater importance that the computer jobs which demand most resources are executed first so that remaining idle time of the core may be utilized more efficiently thus increasing the overall system performance.

In some embodiments, the controller may cause the scheduler to schedule the computer jobs to be executed on a preferred core. E.g. certain computer jobs may be more suited to be run on a particular core than others.

In some embodiments, the controller 402 may be configured to further cause the priority mechanism to form a priority template comprising the synthetic variable load and the priority list and associating the priority template to the set of probes comprising the worst case probe, and to store the priority template associated to the set of probes comprising the worst case probe in a data base 407 for future use (compare with method 300 of FIG. 3).

In some embodiments, the priority trainer 401 is configured to train the many core processing system to recognize a received set of probes comprising a worst case probe and to apply a suitable priority template in order to determine a priority for execution of the one or more computer jobs.

In some embodiments, a suitable priority template may e.g. be priority template which is stored in memory and associated to a set of probes being similar to the recognized set of probes.

Figure 5:
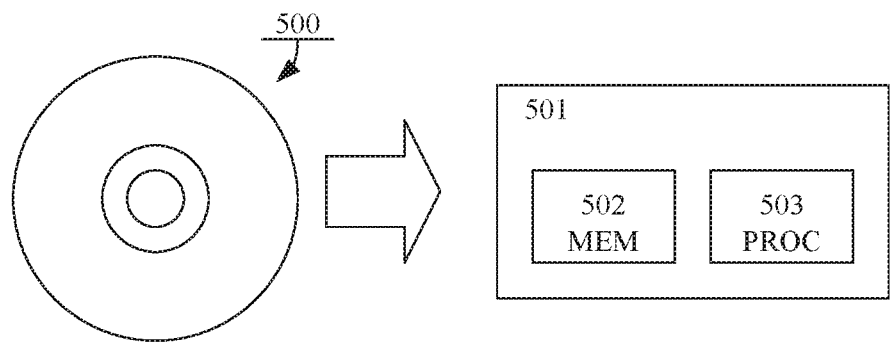
FIG. 5 is a schematic drawing illustrating a computer program product according to some embodiments.

FIG. 5 illustrates a computer program product according to some embodiments. According to some embodiments, the computer program product comprises a computer readable medium 500 such as, for example, a diskette or a CD-ROM. The computer readable medium 500 may have stored thereon a computer program comprising program instructions. The computer program may be loadable into a data-processing unit 501 comprising a memory (MEM) 502 and a processor (PROC) 503, which may, for example, be comprised in a mobile terminal. When loaded into the data-processing unit, the computer program may be stored in a memory 502 associated with or integral to the data-processing unit. According to some embodiments, the computer program may, when loaded into and run by the data-processing unit on the processor 503, cause the data-processing unit 501 to execute method steps according to, for example, the methods shown in any of the FIGS. 2-3.

The described embodiments and their equivalents may be realized in software or hardware or a combination thereof. They may be performed by general-purpose circuits associated with or integral to a communication device, such as digital signal processors (DSP), central processing, units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, or a mobile gaming device.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method of operating a priority trainer of a many core processing system, wherein the priority trainer comprises a controller, the method comprising:
   placing a set of probes into a plurality of computer jobs, wherein each of the probes indicates a measurement endpoint of a corresponding computer job of the plurality of computer jobs to be executed by the many core processing system;
   adding to each of the plurality of computer jobs, in each of a plurality of measurement cycles, a controlled sleep that delays the execution of the plurality of computer jobs;
   measuring, in each of the measurement cycles, the real time slack of the plurality of computer jobs using the set of probes, the real time slack being indicative of available system idle time of the many core processing system;
   reducing an amount of controlled sleep added to the execution of the plurality of computer jobs in a given measurement cycle in response to one or more of the set of probes exceeding a minimum slack threshold in the measurement cycle immediately previous to the given measurement cycle;
   determining a priority for each of the plurality of computer jobs based on the measured real time slack of the measurement cycle in which a least real time slack was measured without any of the probes in the set of probes exceeding the minimum slack threshold;
   ranking the plurality of computer jobs in a priority list based on the determined priorities; and
   scheduling the plurality of computer jobs for execution according to the priority list.

2. The method of claim 1, wherein adding the controlled sleep comprises adding an amount of controlled sleep determined according to SL*(t1−t0), wherein SL is a scale factor, t0 equals a start of an execution time, and t1 equals an end of the execution time.

3. The method of claim 2, wherein SL is determined based on the measured real time slack measured in a previous measurement cycle.

4. The method of claim 1, wherein ranking the plurality of computer jobs comprises ranking the plurality of computer jobs such that a measured first real time slack being larger than a measured second real time slack results in a corresponding first priority ranking being higher than a corresponding second priority ranking in the priority list.

5. The method of claim 1, wherein reducing the amount of controlled sleep added to the execution of the plurality of computer jobs is performed each of the one or more computer jobs according to a round robin algorithm.

6. The method of claim 1, wherein scheduling the plurality of computer jobs for execution according to the priority list comprises scheduling the plurality of computer jobs for execution such that a computer job having the highest priority ranking among the priorities in the priority list is scheduled to be executed first.

7. The method of claim 1, further comprising:
   forming a priority template comprising the priority list and the amount of controlled sleep added in the measurement cycle in which the least real time slack was measured without any of the probes in the set of probes exceeding the minimum slack threshold;
   associating the priority template to the set of probes.

8. The method of claim 7, further comprising storing the priority template associated with the set of probes in a database for future use.

9. The method of claim 1, further comprising training the many core processing system to:
recognize the set of probes; and
apply a suitable priority template in order to determine the priority of at least one of the plurality of computer jobs.

10. A non-transitory computer readable medium storing software instructions for controlling a processing circuit of a many core processing system, wherein the software instructions, when run on the processing circuit, cause the processing circuit to:
place a set of probes into a plurality of computer jobs, wherein each of the probes indicates a measurement endpoint of a corresponding computer job of the plurality of computer jobs to be executed by the many core processing system;
add to each of the plurality of computer jobs, in each of a plurality of measurement cycles, a controlled sleep that delays the execution of the plurality of computer jobs;
measure, in each of the measurement cycles, the real time slack of the plurality of computer jobs using the set of probes in each of the measurement cycles, the real time slack being indicative of available system idle time of the many core processing system;
reducing an amount of controlled sleep added to the execution of the plurality of computer jobs in a given measurement cycle in response to one or more of the set of probes exceeding a minimum slack threshold in the measurement cycle immediately previous to the given measurement cycle;
determine a priority for each of the plurality of computer jobs based on the measured real time slack of the measurement cycle in which a least real time slack was measured without any of the probes in the set of probes exceeding the minimum slack threshold;
rank the plurality of computer jobs in a priority list based on the determined priorities; and
schedule the plurality of computer jobs for execution according to the priority list.

11. A priority trainer of a many core processing system comprising:
a controller circuit configured to:
place a set of probes into a plurality of computer jobs, wherein each of the probes indicates a measurement endpoint of a corresponding computer job to be executed by the many core processing system;
add to each of the plurality of computer jobs, in each of a plurality of measurement cycles, a controlled sleep that delays the execution of the plurality of computer jobs;
measure, in each of the measurement cycles, the real time slack of the plurality of computer jobs using the set of probes, the real time slack being indicative of available system idle time of the many core processing system;
reduce an amount of controlled sleep added to the execution of the plurality of computer jobs in a given measurement cycle in response to one or more of the set of probes exceeding a minimum slack threshold in the measurement cycle immediately previous to the given measurement cycle;
determine a priority for each of the plurality of computer jobs based on the measured real time slack of the measurement cycle in which a least system slack was measured without any of the probes in the set of probes exceeding the minimum slack threshold;
rank the plurality of computer jobs in a priority list based on the determined priorities; and
schedule the plurality of computer jobs for execution according to the priority list.

12. The priority trainer of claim 11, wherein to add the controlled sleep the controller circuit is configured to add an amount of controlled sleep determined according to $SL*(t1-t0)$, wherein SL is a scale factor, t0 equals a start of an execution time, and t1 equals an end of the execution time.

13. The priority trainer of claim 12, wherein the controller circuit is further configured to determine SL based on the measured real time slack measured in a previous measurement cycle.

14. The priority trainer of claim 12, wherein to rank the plurality of computer jobs, the controller circuit is configured to rank the plurality of computer jobs such that a measured first real time slack being larger than a measured second real time slack results in a corresponding first priority ranking being higher than a corresponding second priority ranking in the priority list.

15. The priority trainer of claim 12, wherein to reduce the amount of controlled sleep added to the execution of the plurality of computer jobs, the controller circuit is configured to reduce the amount added to each of the one or more computer jobs according to a round robin algorithm.

16. The priority trainer of claim 12, wherein to schedule the plurality of computer jobs for execution according to the priority list, the controller circuit is configured to schedule the plurality of computer jobs for execution such that a computer job having the highest priority ranking among the priorities in the priority list is scheduled to be executed first.

17. The priority trainer of claim 12, wherein the controller circuit is further configured to:
form a priority template comprising the the priority list and the amount of controlled sleep added in the measurement cycle in which the least real time slack was measured without any of the probes in the set of probes exceeding the minimum slack threshold;
associate the priority template to the set of probes.

18. The priority trainer of claim 17, wherein the controller circuit is further configured to store the priority template associated to the set of probes in a database for future use.

19. The priority trainer of claim 11, wherein the controller circuit is further configured to train the many core processing system to:
recognize the set of probes; and
apply a suitable priority template in order to determine the priority of at least one of the plurality of computer jobs.

* * * * *